Figure 1:
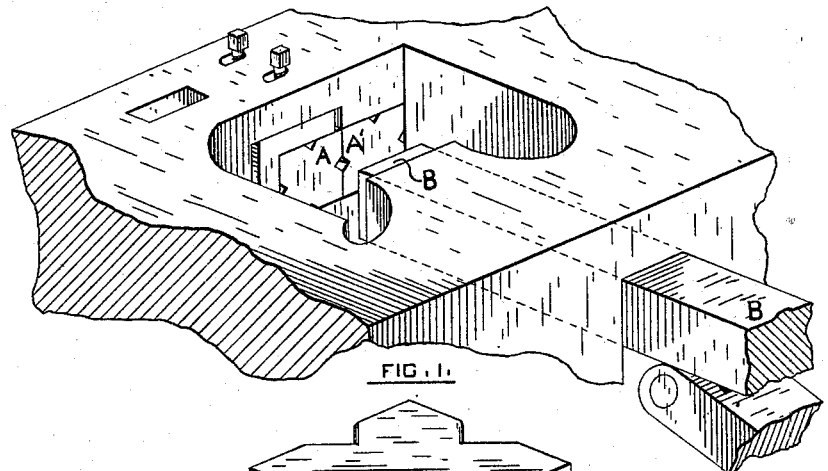

W. E. WARD.
Manufacture of Bolt-Blanks.

No. 215,494. Patented May 20, 1879.

WITNESSES.
Joseph H. Marshall
Joseph Haight

INVENTOR.
William E. Ward

UNITED STATES PATENT OFFICE.

WILLIAM E. WARD, OF PORTCHESTER, NEW YORK.

IMPROVEMENT IN THE MANUFACTURE OF BOLT-BLANKS.

Specification forming part of Letters Patent No. 215,494, dated May 20, 1879; application filed August 12, 1878.

*To all whom it may concern:*

Be it known that I, WILLIAM E. WARD, of Portchester, in the county of Westchester and State of New York, have invented and discovered certain new and useful Improvements in the Manufacture of Bolt-Blanks suitable to be converted into screw-bolts for the use of carriage-makers, and for employment in manufactures generally where such bolts or similar articles are required; and I do hereby declare that the following specification, taken in connection with the drawings making a part of the same, is a full, clear, and exact description thereof.

The purpose of my invention is to produce, by means of a matrix-die of peculiar form and a heading-die of common form, working in combination therewith, bolt-blanks from cold round wire or rods which shall have flanged heads, formed by the process of upsetting the ends of the blanks, and squared portions under the heads of sufficient length to prevent the bolts from turning when the nut on the cylindrical threaded shank is turned, such squared portion being of greater area in cross-section than the sectional area of the cylindrical or shank portion, but so combined with such cylindrical shank of lesser diameter by inclined planes or wedge-faces that the squared portion can be readily driven into and seated in a cylindrical hole bored in wood no larger in diameter than the shank by separating or spreading, instead of tearing away, the fiber of the wood around the edge of the hole.

The means employed to produce the article, as well as the resulting product, I believe to be new.

Previous to my invention, blanks for screw-bolts have been made both from square and from round rods, heated, as well as cold. In both cases the stock, whether square or circular in cross-section, is usually first cut into suitable lengths for the size of bolt required, and a head is formed upon each piece by the process of upsetting that portion of the end which is allowed to project beyond the anvil-face of a pair of clamps or jaws which gripe and hold the blank while the head-forming die does its work of swaging and forming the flanged head. If iron of square cross-section is used, it is necessary to convert that portion of the bolt which is to be threaded for receiving a nut into a cylindrical form, and this may be successfully done by the process of successively rolling all that part of the blank which is to constitute the round shank between segmental dies, as described in Letters Patent heretofore granted to me.

In bolts of this character the squared portion under the head can be of any desired length, and its sectional area is greater than the sectional area of the portion which is rolled; but the squared portion is connected with the cylindrical portion by planes having faces which are concave or curved inward, as the necessary result of the action of the roller-dies. This method of manufacture, while producing a bolt-blank of very high grade and quality, is costly to make, for the reason that each blank must be separately rolled. Cheap bolt-blanks are also largely made by heating and swaging the same from the round rods of commerce. In this manufacture the portion which is required to be squared is formed by means of swaging-dies, which are moved laterally toward each other contemporaneously, or nearly so, with the longitudinal movement of the heading-die in upsetting the end of the blank. Bolt-blanks so made have the cross-section of their squared portions no greater in area than the cross-sections of their round shanks, and are of inferior value on this account. Again, bolt-blanks are made by the process of lateral swaging above mentioned from specially-prepared short lengths of round iron which have been upset or thickened at one end to furnish a sufficient amount of stock or material to form a squared portion of larger sectional area than the part which is to be threaded; but such manufacture involves the expense of thus specially preparing the stock for each blank, and, moreover, the corners of the squared portion are abrupt at the junction of the squared part with the round part.

Attempts have frequently been made to make bolt-blanks from cold round iron by the simple process of forcing the metal into a matrix or rectangular cavity, located at the end of the griping-dies, for forming the squared part by the action of the heading-die in upsetting and forming the flanged head. All such attempts have resulted in failure, for the reason that it has not been practicable heretofore to make the squared portion under the head of sufficient length contemporaneously with the formation of the flanged head by simple end pressure. The conditions under which the squared portion is formed involve the rolling up or bending of the fiber of the metal nearest the shoulder of the matrix at right angles, or nearly so, to its length, and the resistance on this account is so great that the heading-die is unable to swage a head of the proper size and also upset a squared section materially larger than one-half the diameter of the blank.

In endeavoring to reach the practically successful result in this manufacture which I have now accomplished, I prosecuted a long series of experiments in the effort to produce a bolt-blank of the same general character as the one shown in the drawings, from heated bars of round iron, by means of dies of substantially the same form as those hereinafter described, being under the supposition that better results, so far as the production of a long squared section is concerned, could be obtained from working the iron while heated than when cold. My efforts, however, resulted in failure to accomplish any practically useful result. The scale necessarily formed by the oxidation of the heated iron immediately choked the channels or grooves for shaping the square connecting the rectangular matrix with the round griping-jaws, while the hot metal attacked the temper of the rectangular matrix at points midway between the corners, as a result of the unequal distribution of the flow of the metal in undergoing a change in sectional form from the round to the square, and presently a constantly-growing accretion of iron would adhere to each side of the matrix, which would destroy the form of the dies in a few moments, although a stream of water was constantly applied to cool them.

My invention makes available in the manufacture of bolt-blanks the principle (which I believe myself to have been the first to discover) that the redisposition of the molecules of metal from the effect of pressure, applied to the metal while in a cold state, and to effect a change in sectional form from round to square, can be carried to the farthest extent when the mass is made to move in the direction of the fiber, and in the absence of a resistance which prevents the particles of metal from gliding upon each other. The result has been that I have been enabled to produce, as a regular practicable manufacture, bolt-blanks from round iron by means of griping-dies, a suitable matrix, and a heading-die, which have the following characteristics: first, a flanged head; second, a portion directly under the head which is a full square in cross-section, and is of larger area than the area of the cross-section of the round iron from which it was made and of the round shank held by the griping-dies; third, a portion which connects the squared part with the round shank, and which I call a "spike-section," and which is in itself a novel feature, invented by me, the two-fold office of which is to practically prolong the squared portion, to aid in preventing the bolt from turning on its axis when inserted in wood, and also to enable the bolt to be driven into a hole no larger than the shank, and be readily seated on its flange by laterally compressing, instead of tearing away, the fiber of the wood.

Figure 4:
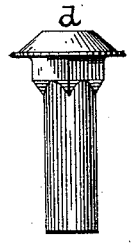

Referring to the drawings, A A' in the several figures represent a pair of dies of suitable form to produce the bolt-blank shown at Fig. 4.

At Fig. 1 the dies are represented in combination with a header, B, and arranged as they would be in an ordinary heading-machine.

The means by which the griping-dies are made to open and close at the proper times to gripe and then release the blank are not shown, neither are the devices for working the heading-die represented, the same being familiar to constructors of this kind of machinery.

Figure 2:
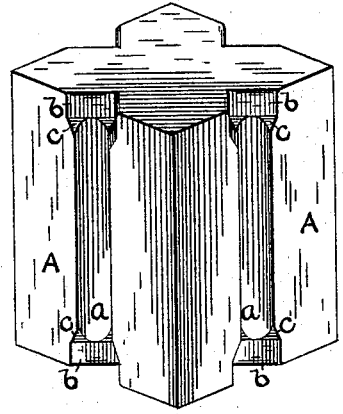
Figure 3:
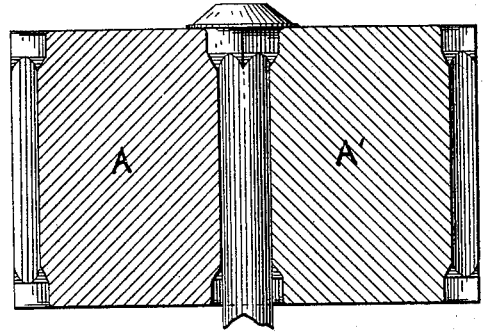

At Fig. 2 is shown, in perspective, one of the two die-blocks which make a pair. Each block has four faces, and is an aggregation of four double-length semi-cylindrical jaws, a, for griping the round shank of the bolt-blank, and of eight semi-matrices, to enable the different faces to be used in succession, or the block to be turned end for end, as is the customary way of making the griping faces and dies of bolt-machines. These longitudinal angular recesses, inclined at their ends and terminating within the cylindrical portion of the die for forming the spike-sections, were never, so far as my knowledge extends, employed in dies for making bolt-blanks prior to my invention thereof. The form of the matrices is clearly shown in the drawings.

It will be seen that the dies, when in position for service, have a cylindrical recess, $a$, for receiving and griping a round shank; a front face, against which the head is formed by cold upsetting; a full square recess, $c$, adjacent to the face, of greater sectional area than the cylindrical portion; and longitudinal angular recesses $b$ at each corner of the square, which extend beyond the square and incline toward and terminate within the cylindrical portion of the die.

When two die-blocks are brought face to face, the rectangular cavity with tapering V-shaped grooves or channels at the corners, which constitutes the matrix, and the cylindrical cavity, which holds the shank, are the counterpart or mold of the bolt-blank, Fig. 4, with the exception of its flanged head $d$, which last is formed in the customary way by means of the heading-die B acting to upset the projecting end of a round rod or bar while it is held between the griping-faces $a$ of the dies A A'.

By the use of a pair of griping dies or jaws having a matrix of the character substantially as described, in combination with a suitable heading-die for upsetting the end of the blank allowed to project beyond the anvil-face of the dies, and operated by proper means, a round cylindrical rod of iron can, while cold, be fashioned or converted into a bolt-blank having a flanged head, a section immediately under the head which is a full square, and a spike-section composed of inclined planes of straight faces connecting the squared portion with the cylindrical shank.

The metal being worked while in a cold state, no scale is formed to clog the channel-ways leading from the matrix of the square to the cylindrical cavity of the dies, or to form adhering accretions to the faces of the dies, and the metal, while its form is changing, is permitted to glide upon itself or move in the direction of its fiber to form the spike-section, instead of being crippled by impact against an abrupt shoulder, and thus is accomplished a practical extension of the squared portion, and the use of the bolt facilitated in holes which are bored no larger in diameter than the diameter of the cylindrical shank.

What I claim as my invention, and desire to secure by Letters Patent, is—

1. For the manufacture of square-necked bolt-blanks from cold round metal, dies having a cylindrical recess for receiving and gripping a round shank, a front face against which the blank-head is upset, a full square recess or matrix adjacent to the front face, of greater sectional area than the cylindrical portion, and longitudinal angular recesses at each corner of the square matrix, which extend beyond said square and incline toward and terminate within the cylindrical portion, substantially as described.

2. As an improved article of manufacture, a cold-upset bolt-blank having a flanged head, a round shank, a full square neck beneath the head of greater sectional area than the shank, and spike-sections with pointed ends which extend from the square corners of the neck and merge with the round shank, substantially as described.

WILLIAM E. WARD.

Witnesses:
JOSEPH H. MARSHALL,
JOSEPH HAIGHT.